(12) United States Patent
Mask et al.

(10) Patent No.: US 8,407,864 B2
(45) Date of Patent: *Apr. 2, 2013

(54) SYSTEMS AND METHODS FOR SECURING PORTIONS OF A CORD

(75) Inventors: Karen J Mask, Bellevue, WA (US); Duane M Mask, Newcastle, WA (US)

(73) Assignee: Cord Controller, LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,847

(22) Filed: Oct. 18, 2011

(65) Prior Publication Data

US 2012/0031778 A1 Feb. 9, 2012

Related U.S. Application Data

(63) Continuation of application No. 12/255,747, filed on Oct. 22, 2008, now Pat. No. 8,042,232.

(51) Int. Cl.
*B65D 85/86* (2006.01)

(52) U.S. Cl. ......................................................... 24/16 R

(58) Field of Classification Search ................... 24/16 R, 24/16 PB, 17 R, 17 A, 17 B, 17 AP, 306, 24/442, 20 S; 206/702; 229/87.03
See application file for complete search history.

(56) References Cited

U.S. PATENT DOCUMENTS

| 4,868,955 A * | 9/1989 | Magnant et al. ................ 24/306 |
| 5,915,899 A * | 6/1999 | Dennis ............................ 410/36 |
| 8,042,232 B2 * | 10/2011 | Mask et al. ..................... 24/16 R |

* cited by examiner

*Primary Examiner* — James Brittain
(74) *Attorney, Agent, or Firm* — Lowe Graham Jones PLLC

(57) ABSTRACT

Systems and methods are operable to secure a coiled portion of an electrical cord, a cable, or a rope. An exemplary embodiment has a coil securing portion with an interior surface, a collapsing portion joined with the coil securing portion, and a means for securing the coil retainer in a collapsed position. The coil securing portion and the collapsing portion cooperatively define a substantially tubular interior region and an opening, wherein the interior region is configured to receive a coil portion inserted through the opening when the coil retainer is in an open position. The coiled portion is frictionally secured by the interior surface of the coil securing portion when the coil retainer is secured in the collapsed position.

19 Claims, 4 Drawing Sheets

SYSTEMS AND METHODS FOR SECURING PORTIONS OF A CORD

PRIORITY CLAIM

This patent application is a Continuation application of, and claims priority from, U.S. Non-Provisional patent application Ser. No. 12/255,747 filed Oct. 22, 2008 now U.S. Pat. No. 8,042,232, and entitled, "Systems and Methods for Securing Portions of a Cord," the contents of which are hereby incorporated by reference in its entirety.

BACKGROUND OF THE INVENTION

A coiled portion of a electrical cord, a cable, or a rope is typically secured using a tie or the like. The tie secures adjacent portions of the coiled electrical cord, cable, or rope.

For example, an iron cord may be difficult to conveniently store when the iron is not in use. The iron cord might be wrapped around the handle of the iron in an attempt to secure the iron cord. However, the iron cord may comes loose, and often makes storage of the iron difficult. As another example, a lamp cord may be much longer than necessary to connect the lamp to the electrical outlet. The excess lamp cord will often be left on the floor, which may become a safety hazard. Also, the excess lamp cord may be unsightly. Even if the excess lamp cord is tucked underneath and/or behind another object, such as a dresser or a table, the excess cord may become dislodged during cleaning.

The unused portion of an electrical cord may be coiled into a coil portion. Then, a length of wire tie may be wrapped around the midsection of the electrical cord coil portion and tightened. The secured portion of the electrical cord coil can then be placed in a convenient, out of the way location so that the secured electrical cord coil does not become a hazard or nuisance.

However, using a tie to secure a coiled portion of an electrical cord has several disadvantages. First, forming a coil in a portion of the electrical cord may be difficult, especially for a person who may be physically challenged. Second, it may be difficult to secure the tie around the coiled portion of the electrical cord since the tie must first be placed in a desired position about the coil portion, and then the coil must be maintained while the tie is being secured. Further, the tie typically leaves large portions of the coiled cord unsecure. For example, the unsecured ends of the secure coil portion may become entangled with other objects, thereby creating a potential hazard or nuisance. And finally, it may be difficult to find a tie as they are small and easily misplaced.

In some situations, it may be desirable to secure two or more coiled electrical cord portions together. However, a single tie may not be large enough, or strong enough, to secure more than one single electrical cord. Further, forming multiple coils from multiple electrical cords, and maintaining the coil portions while the tie is being secured, may be a very difficult and challenging physical task.

The above-described securing of a coiled portion of an electrical cord is equally applicable to other long flexible structures, such as cords, cables, ropes, chains, or the like. For example, boat ropes can be difficult to maintain in a secure manner so that that they are easily accessible. During a critical maneuver of a boat, such as during a docking procedure, the operators must have ready access to the plurality of docking ropes, which are typically stored in a coiled form. However, if the docking ropes are jumbled and tangled together, it will be relatively difficult to prepare a boat for docking. Accordingly, it would be desirable to have a means for easily securing, storing, and retrieving a plurality of coiled docking ropes.

SUMMARY OF THE INVENTION

Systems and methods of securing a coiled portion of a electrical cord, cable, or a rope are disclosed. An exemplary embodiment has a coil securing portion with an interior surface, a collapsing portion joined with the coil securing portion, and a means for securing the coil retainer in a collapsed position. The coil securing portion and the collapsing portion cooperatively define a substantially tubular interior region and an opening, wherein the interior region is configured to receive a coil portion inserted through the opening when the coil retainer is in an open position. The coiled portion is frictionally secured by the interior surface of the coil securing portion when the coil retainer is secured in the collapsed position.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
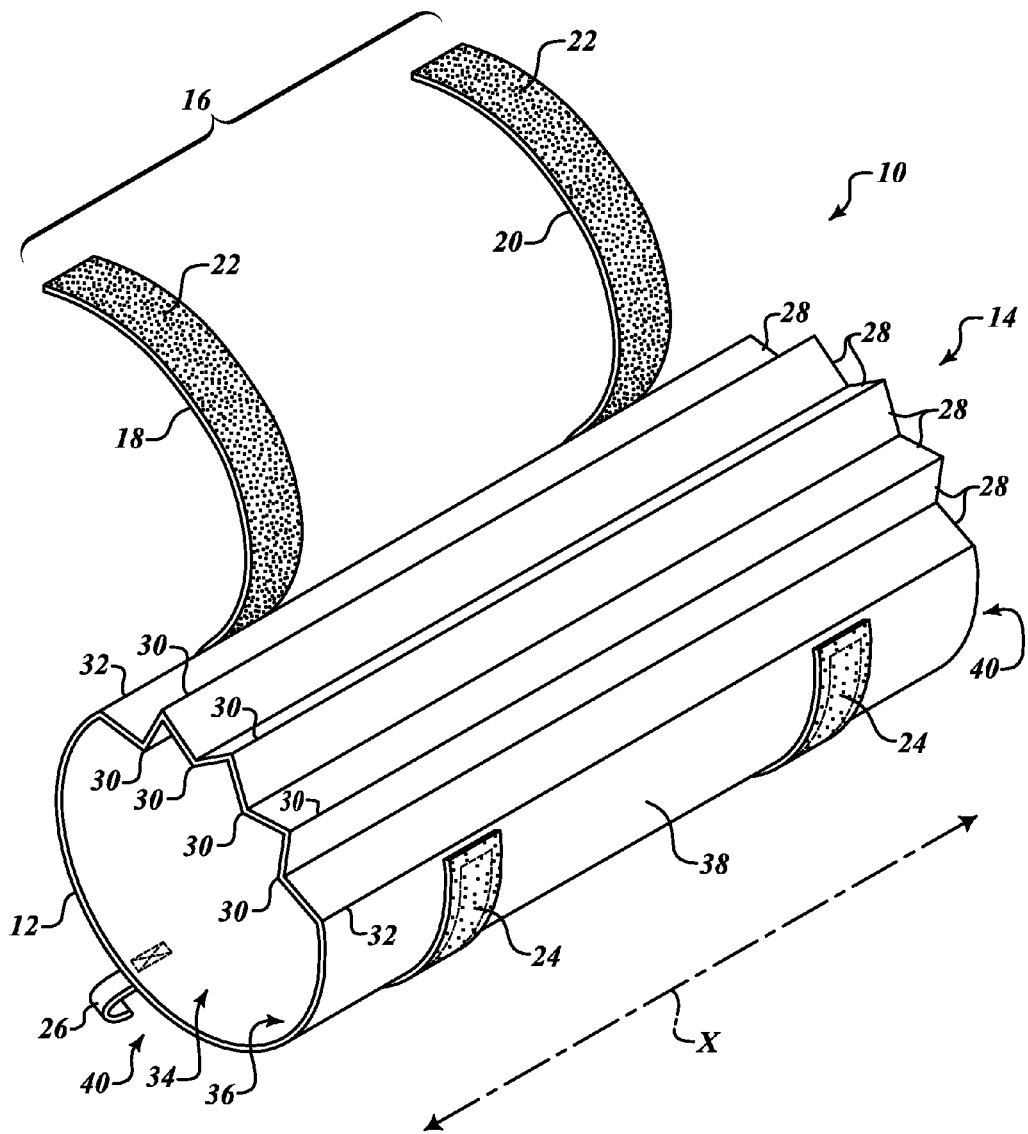
FIG. 1 is a perspective view of an embodiment of an opened coil retainer.

FIG. 1 is a perspective view of an embodiment of an opened, or uncollapsed, coil retainer 10. That is, the coil retainer 10 is open and ready to receive a coiled portion of an electrical cord, a cable, a rope, a chain, or the like. The coil retainer 10 includes a relatively flexible coil securing portion 12, a collapsing portion 14, and a securing means 16.

The coil securing portion 12 is operable to hold the collapsing portion 14 in an opened position prior to insertion of a coiled portion of an electrical cord, a cable, or a rope that is to be secured by the coil retainer 10. The coil securing portion 12, in one embodiment, is has a cross section that is substantially tubular. Other embodiments may have any suitable cross sectional shape.

The collapsing portion 14 is collapsible such that after the coil portion is inserted into the coil retainer 10, the coil retainer 10 may be collapsed, or closed, about the coil portion to frictionally secure the coil portion therein. In a preferred embodiment, the collapsing portion 14 is an accordion pleat having a series of permanent folds of equal width in alternating opposite directions.

The coil retainer 10 is preferably defined by a length that is preferably at least a long as the secured coil portion. Accordingly, the coil securing portion 12 and the collapsing portion 14 are aligned along a longitudinal axis "x" corresponding to the length of the coil retainer 10. By substantially being equal in length to the secured coil portion, ends of the secured coil will not easily become entangled with other objects, other cords, other cables, and/or other ropes. It is appreciated that the coil retainer 10 may be longer than the secured coil. Further, some embodiments may have a length that is shorter than the secured coil. With such embodiments, the user may secure a selected part of the coil portion.

In the illustrated embodiment of FIG. 1, the coil securing portion 12 and the collapsing portion 14 have the same length. In alternative embodiments, the collapsing portion 14 may be shorter than the coil securing portion 12. In other embodiments, a plurality of shorter collapsing portions 14 may be used.

The securing means 16 preferably is a first strap 18 and a second strap 20. In one embodiment, the straps 18, 20 are Velcro straps wherein a strap end 22 is securable to an opposing strap end 24. Any suitable fastening means may be used to secure the strap ends 22, 24, such as a slidably engaging snap fastener, a buckled fastener, a clasp fastener, a magnetic fastener, or a quarter-turn fastener. In some embodiments, the securing means 16 may be a loop of elastic material. Some embodiments may use a single strap, or may use more that the illustrated two straps 18, 20. The straps 18, 20 may be made of any suitable material, such as a polymeric material, metal, leather, rope, or the like.

Alternative embodiments may use other suitable securing means 16 to secure the collapsed coil retainer 10. For example, snaps, buttons, or the like, may be affixed to opposing sides of the coil securing portion 12 and/or affixed to the collapsing portion 14 such that upon collapsing, the securing means 16 secures the coil retainer 10 in its collapsed position to maintain the frictional forces which secure the coiled portion or the electrical cord, cable, or rope therein.

An optional securing device 26 may be included that is configured to secure the coil retainer 10 to another device or structure in a desired location. Accordingly, the coil retainer 10 may be located in a place where it is not a hazard or nuisance. For example, the embodiment illustrated in FIG. 1 has a simple hook as the securing device 26. The hook 26 may be used to secure the coil retainer 10 to a wall, another cord, or a device operable to couple with the hook 26. Other suitable fastening devices may be used for the securing device 26, such as, but not limited to, clasps, rings, snaps, buttons (or button holes), loops, grommets, hanging cords, or the like.

In an exemplary embodiment, the collapsing portion 14 is formed of a series of pleats 28. Adjacent pleats 28 are coupled together via a joining portion 30, such that the collapsing portion 14 resembles an accordion-like collapsible pleat structure. In one embodiment, the relative rigidly of the pleats 28, in cooperation with the relative rigidly of the coil securing portion 12, act cooperatively to maintain the longitudinal shape of the coil retainer 10.

In the exemplary embodiment illustrated in FIG. 1, the collapsing portion 14 includes eight (8) relatively rigid pleats 28 and seven (7) joining portions 30 which join adjacent pleats 28. The collapsing portion 14 may include any suitable number of pleats 28. Additionally, joining portions 32 flexibly connect the edges of the coil securing portion 12 with the end pleats 28 of the collapsing portion 14.

The coil securing portion 12 and the collapsing portion 14 cooperatively define an interior region 34, an interior surface 36, an exterior surface 38, and at least one opening 40. As described below, a coiled portion is inserted into the interior region 34 via the opening 40.

In a preferred embodiment, the collapsing portion 14 is formed of a molded polymeric material wherein the thickness of the coil securing portion 12 is designed to provide the relative rigidity which holds the coil retainer 10 in an open position when the ends 22, 24 of the straps 18, 20 are not secured to each other, and is designed so that the coil retainer 10 may be flexibly collapsed when the ends 22, 24 of the straps 18, 20 are fastened to each other. In some embodiments, the coil retainer 10 is formed by extruding an elastic polymeric material so that the coil securing portion 12 and the collapsing portion 14 are formed as a single piece.

In other embodiments, the coil retainer 10 may be made of another suitable material, such as cardboard, paper, canvass, cloth, fiberglass, and/or metal. In some embodiments, the coil securing portion 12 and the collapsing portion 14 may be made of different materials. For example, but not limited to, the coil securing portion 12 may be a polymeric extruded piece and the collapsing portion 14 may be cloth. Further, the pleats 28 and the joining portions 30, 32 may be made of different materials and/or may use any suitable structure. For example, the joining portions 30 and/or 32 may be a hinge made of plastic or metal.

Figure 2:
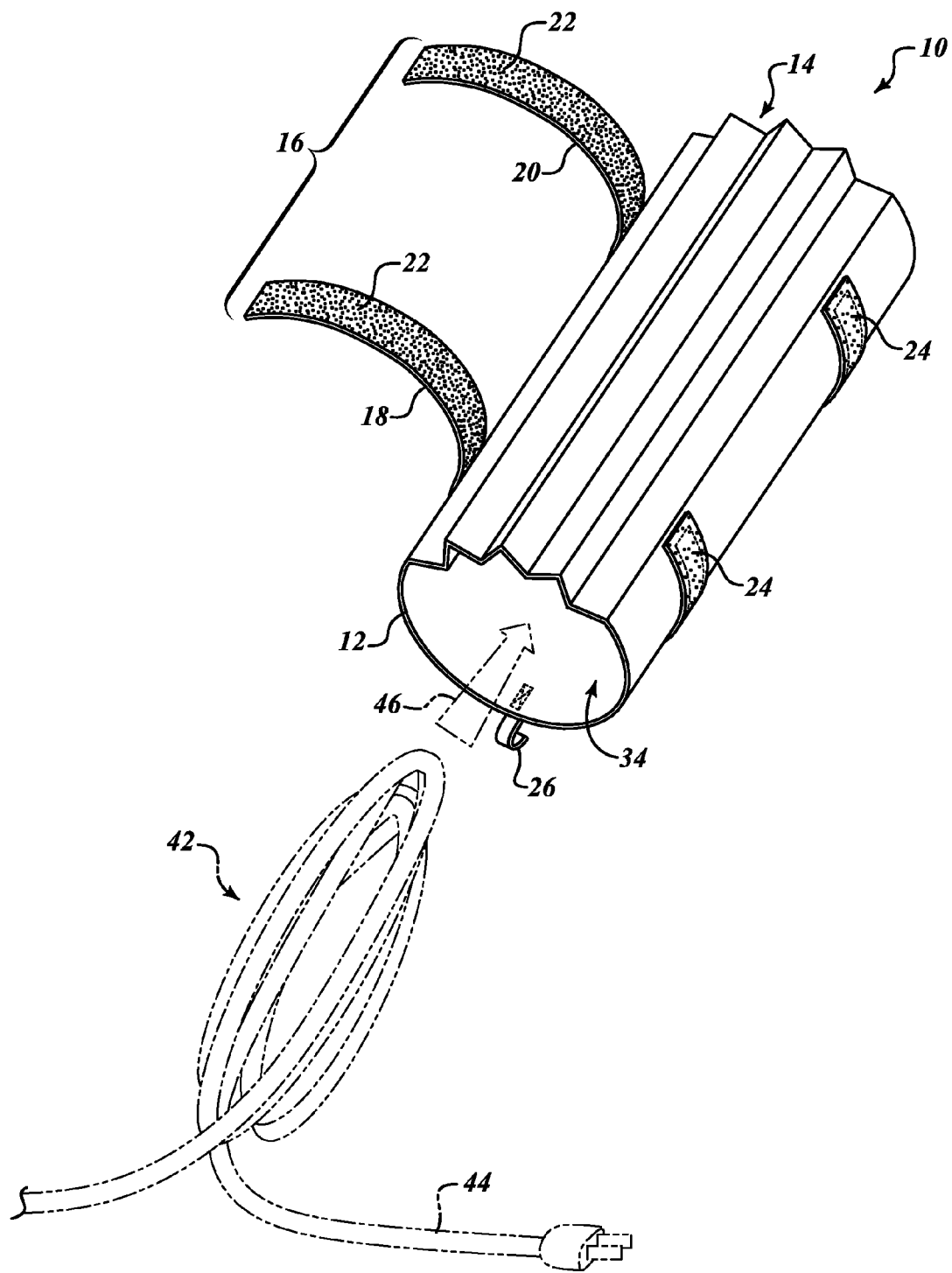
FIG. 2 is a perspective view of the embodiment of the coil retainer with a coiled portion of an electrical cord oriented in position for insertion into the coil retainer.

FIG. 2 is a perspective view of the embodiment of the coil retainer 10 with a coiled portion 42 of an electrical cord 44 oriented in position for insertion into the coil retainer 10, as indicated by the directional arrow 46. Thus, after the user has formed the coiled portion 42 from a portion of the electrical cord 44, the user inserts the coiled portion 42 into the opening 40 of the coil retainer 10.

Since the relatively flexible coil securing portion 12 holds the coil retainer 10 in its open position, the opening 40 remains large enough to readily receive the coiled portion 42. Here, the user may use one hand to hold and insert the coiled portion 42, while the other hand is used to hold and orient the coil retainer 10.

Figure 3:
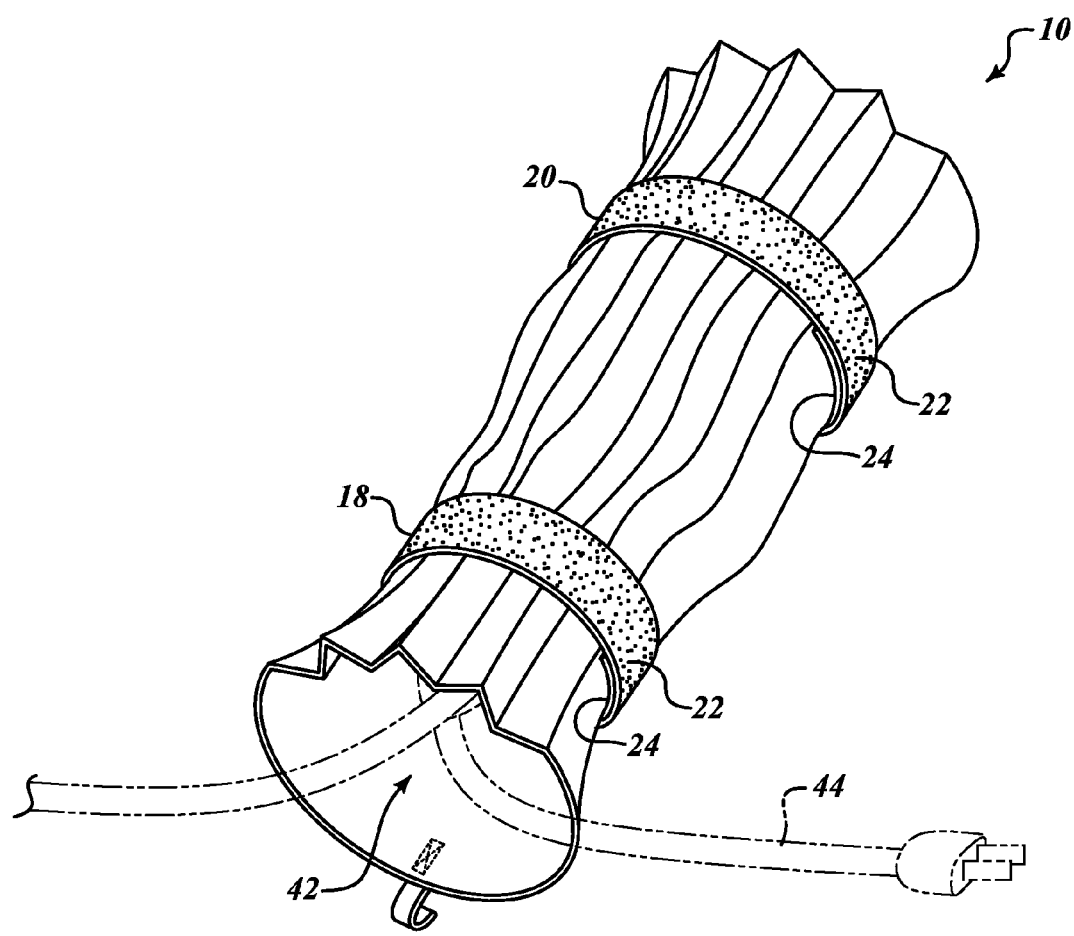
FIG. 3 is a perspective view of the embodiment of the coil retainer with the coiled portion of the electrical cord secured therein.

FIG. 3 is a perspective view of the embodiment of the coil retainer 10 with the coiled portion 42 of the electrical cord 44 secured within the interior region 34. The coiled portion 42 is frictionally secured by contact with the interior surface 36 of the securing portion 12. The coiled portion 42 contacts the interior surface 36 as the coil retainer is collapsed into the collapsed position in response to coupling the strap ends 22 with their corresponding strap ends 24. That is, by securely and tightly fastening the strap ends 22, 24 to each other, the interior surface 36 of the coil retainer 10, and more particularly, the interior surface of the coil securing portion 12, frictionally secure the coiled portion 42 within the interior region 34 of the coil retainer 10.

Figure 4:
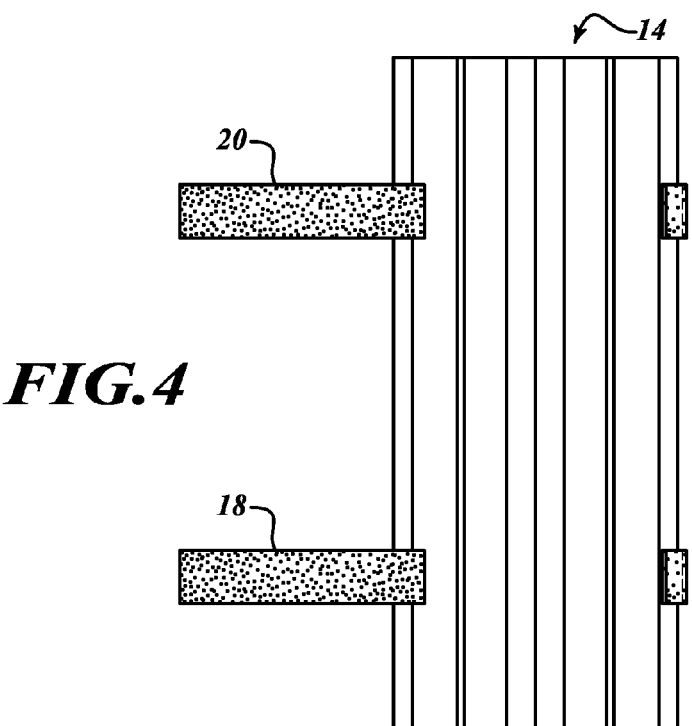
FIG. 4 is a top view of the embodiment of the coil retainer.
Figure 5:
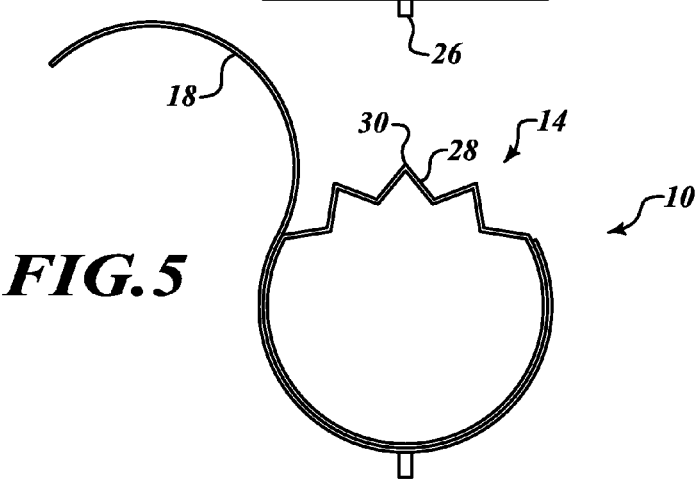
FIG. 5 is an end view of the embodiment of the coil retainer.
Figure 6:
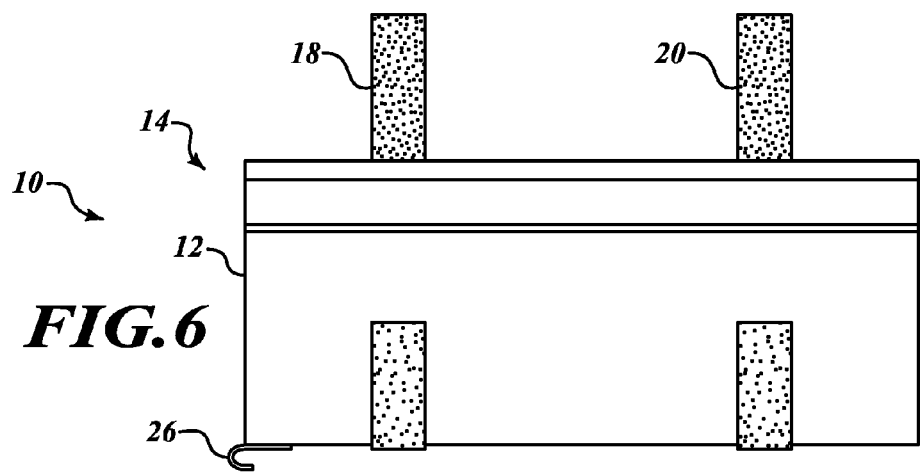
FIG. 6 is a is a side view of the embodiment of the coil retainer.

FIG. 4 is a top view of the embodiment of the coil retainer 10. FIG. 5 is an end view of the embodiment of the coil retainer 10. FIG. 6 is a is a side view of the embodiment of the coil retainer 10.

The exterior 38 of the coil retainer 10 may have a decorative color so as to blend in with the surroundings where the coil retainer 10 is used. In other applications, the exterior 38 may be colored so as to be readily visible to a person. For example, a bright orange or red color may be used as a warning to the user that the secured coiled portion 42 may be a potential hazard or nuisance.

The materials used in the various embodiments may be selected based upon a particular application. For example, the coil retainer 10 may be made of a fire resistive material and/or an electrically insulative material where fires or electrical shocks are of concern.

It is appreciated that embodiments of the coil retainer 10 may be made in different sizes and/or lengths to accommodate various applications. For example, a coil retainer 10 used to secure a portion of an electric cord for an iron may be relatively small. In contrast, a coil retainer 10 used to secure a portion of a long power cord may be relatively larger. Further, the diameter of the opening 40 may be sized to accommodate different applications.

It is also appreciated that embodiments of the coil retainer 10 may be operable to secure multiple coiled portions 42. More particularly, the coil retainer 10 may be easily reopened to insert an additional coiled portion 42.

Embodiments of the coil retainer 10 reduce the danger as well as decrease the unsightliness of any excess cord on the floor attached to a floor lamp, or other electrical furnishings. The coil retainer 10 increases user safety when there is an excessive length of cord from unit to wall outlet and the cord is lying in danger. Using the coil retainer 10 will increase safety in the home by controlling the cords lying unsightly on the floor and will help avoid anyone tripping on the excess cord. When using the coil retainer 10 for storing and hiding any excess cord in the, either solid colored or designed the beauty of the room thru neatness and coordinating color will be enhanced.

Embodiments of the coil retainer 10 reduce the danger and increases the efficiency of storing electrical cords permanently attached to small electrical appliances, i.e. iron, toaster, mixer, hair dryer, etc. There are many electric cords permanently attached to appliances and other electrically electrical items that could be stored in a manner that would prevent accidents and prolong the life of the appliance. For example, the coil retainer 10 can control the cord of an iron or toaster after being used instead of wrapping the permanently attached cord around the iron during storage, the coil retainer 10 prevents the cord from damaged thru twisting of the wiring or being wrapped around a hot iron or toaster.

Embodiments of the coil retainer 10 improve the efficiency and space required to store either short or longer extension cords. Longer extension cords are typically unmanageable when not in use and may cause harm if not stored efficiently. The coil retainer 10 prevents tangling and knotting of extension cords that are not being used but will be used again at future dates. These extension cords can be wrapped up and stored in a pleasing and less frustrating method. There are many sizes of indoor and outdoor extension cords which are used for Christmas decorations, gardening uses, and many other uses. The coil retainer 10 allows clean and efficient storage of the extension cords when they are not being used. The coil retainer 10 will be available in a variety of colors, designs, and sizes to fit every need. A coil retainer 10 will make the home much safer, attractive and more efficient.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A coil retainer, comprising:
    a coil securing portion with an interior surface that frictionally secures a coil portion when the coil retainer is in a collapsed position; and
    a collapsing portion joined with the coil securing portion to cooperatively define an interior region, a first opening, and a second opening, wherein the interior region is configured to receive the coil portion inserted through one of the first and the second openings when the coil retainer is in an open position,
    wherein the collapsing portion, when collapsed, is operable to cause the coil securing portion to frictionally secure the coil portion.

2. The coil retainer of claim 1, wherein the coil portion is a portion of an electrical cord.

3. The coil retainer of claim 1, wherein the coil securing portion and the collapsing portion are aligned together along a longitudinal axis.

4. The coil retainer of claim 3, wherein a length of the coil retainer along the longitudinal axis is substantially equal to a length of the secured coil portion.

5. The coil retainer of claim 1, further comprising at least one separable fastener strap.

6. The coil retainer of claim 5, wherein the coil securing portion is made of a relatively rigid material that holds the coil retainer in the open position when the at least one separable fastener strap is unsecured, and wherein the relatively rigid material of the coil securing portion flexes to frictionally secure the coiled portion when the at least one separable fastener strap is secured to hold the coil securing portion in the collapsed position.

7. The coil retainer of claim 1, wherein the collapsing portion comprises:
    a plurality of pleats; and
    a corresponding plurality of joining portions which join adjacent pleats.

8. The coil retainer of claim 7, wherein at least one of the joining portions is a hinge.

9. The coil retainer of claim 7, wherein the collapsing portion is an accordion pleat.

10. A coil retainer, comprising:
    a coil securing portion with an interior surface that frictionally secures a coil portion when the coil retainer is in a collapsed position; and
    an accordion pleat joined with the coil securing portion to cooperatively define an interior region, a first opening and a second opening, wherein the interior region is configured to receive the coil portion inserted through the one of the first and the second openings when the coil retainer is in an open position,
    wherein the accordion pleat and the coil securing portion, when collapsed, are operable to cause the coil securing portion to frictionally secure the coil portion.

11. The coil retainer of claim 10, wherein the coil portion is a portion of an electrical cord.

12. The coil retainer of claim 10, wherein the coil securing portion is substantially tubular in a cross section.

13. The coil retainer of claim 10, wherein the coil securing portion is defined by a length along a longitudinal axis, and wherein the length is at least as long as the secured coil portion.

14. The coil retainer of claim 10, further comprising at least one separable fastener strap.

15. A coil retainer system, comprising:
    a means for securing a coil portion with an interior surface, wherein the interior surface frictionally secures the coil portion when the coil retainer system is in a collapsed position; and
    a means for collapsing joined with the means for securing, wherein the means for securing and the means for collapsing cooperatively define an interior region and define an opening of the coil retainer system, wherein the interior region is configured to receive the coil portion inserted through the opening when the coil retainer system is in an open position;
    wherein the means for collapsing, when collapsed, is operable to cause the means for securing to frictionally secure the coil portion.

16. The coil retainer system of claim 15, wherein the coil portion is a portion of an electrical cord.

17. The coil retainer system of claim 15, further comprising a means for securing the coil retainer system in the collapsed position.

18. The coil retainer system of claim 15, wherein the means for securing the coil portion and the means for collapsing cooperatively define a substantially tubular interior region.

19. The coil retainer system of claim 15, wherein the means for securing the coil portion is defined by a length along a longitudinal axis of the coil retainer system, and wherein the length is substantially equal to a length of the secured coil portion.

* * * * *